United States Patent  [11] 3,620,387

[72] Inventors Ronald D. Elson
 Merrill;
 Norman O. Krenke, Saginaw, both of Mich.
[21] Appl. No. 5,576
[22] Filed Jan. 26, 1970
[45] Patented Nov. 16, 1971
[73] Assignee Baker Perkins Inc.
 Saginaw, Mich.

[54] HOOK-TYPE PALLET UNSTACKER WITH DOUBLES ELIMINATOR
 15 Claims, 4 Drawing Figs.
[52] U.S. Cl. ..................................... 214/8.5 A,
 214/8.5 G
[51] Int. Cl. ....................................... B65g 59/02
[50] Field of Search .......................... 214/8.5 R,
 8.5 A, 8.5 G

[56] References Cited
 UNITED STATES PATENTS
 3,404,789 10/1968 Georgeff ..................... 214/8.5 D
 3,534,872 10/1970 Roth ............................ 214/8.5 C

*Primary Examiner*—Albert J. Makay
*Assistant Examiner*—George F. Abraham
*Attorney*—Learman, Learman & McCulloch ABSTRACT: A hook-type pallet unstacker mounted adjacent the supply end of a pallet receiving conveyor for movement between a raised inoperative position and a lowered unstacking position for sequentially unstacking pallets from a stack and delivering them individually to the conveyor. The conveyor is pivotally mounted at its supply end and is movable from a first normally operative horizontal position in which it receives the unstacked pallets and conveys them in a first path of travel, if the pallets are unstacked singly, to and from a second downwardly tilted reject position in which it discharges the nested pallets which are delivered when more than one pallet is inadvertently simultaneously removed from the stack by the unstacker. Apparatus is provided for pivoting the conveyor to the reject position to lower the discharge end of the conveyor to discharge nested pallets along the second path of travel and to simultaneously raise the supply end of the conveyor, which raises the pallet unstacker to the inoperative position and prevents further unstacking until the nested pallets are discharged.

HOOK-TYPE PALLET UNSTACKER WITH DOUBLES ELIMINATOR

This invention relates to unstacking and conveying apparatus for individually unstacking a stack of pallets and transferring them to a conveyor, and more particularly to apparatus for rejecting unstacked nested pallets, which in the trade are referred to as "doubles," while simultaneously temporarily halting the unstacking apparatus while the nested pallets are being rejected.

In large scale bakery operations, pallets for packaged bread which are temporarily not in use are often stored in stacks and, upon demand, they are unstacked with apparatus such as that disclosed in the copending U.S. Pat. application, Ser. No. 800,913, filed Feb. 19, 1969, which is assigned to the assignee of the present invention and incroporated herein by reference. When such pallets or trays are nested in a stack, those which become slightly cocked in the stack are sometimes difficult to easily separate due to the close fit thereof. The "sticking" of adjacent containers sometimes results in a "double" being removed from the stack.

Another problem attendant with pallet unstacking mechanism is the occasional inadvertent misorientation of a stack of pallets which is supplied to the unstacker. Pallets which are crosswisely disposed rather than lengthwisely disposed, or vice versa, relative to other pallets which have been unstacked, will create problems with handling machinery which is designed to handle pallets or trays in a predetermined orientation and must be removed. Throughout the remainder of the specification and claims the term "mispositioned" will be used to refer to both misoriented pallets and "doubles."

Briefly, in accordance with the present invention, there is provided means movable between a raised disabled position and a lowered operative position for sequentially unstacking a stack of nested pallets by sequentially removing the uppermost pallet in the stack, receiving conveying means mounted for movement between a first normal conveying position for receiving and conveying individually unstacked pallets in a first path of travel, and a second reject position for discharging mispositioned pallets in a second path of travel, and mechanism for moving the conveying means to the reject position to discharge the mispositioned pallets along the second path while substantially simultaneously moving the unstacking means from the operative position to the inoperative position.

Various other features and advantages of the invention will be apparent to those skilled in the art from the following detailed description taken in conjunction with the drawings in which.

Figure 1:
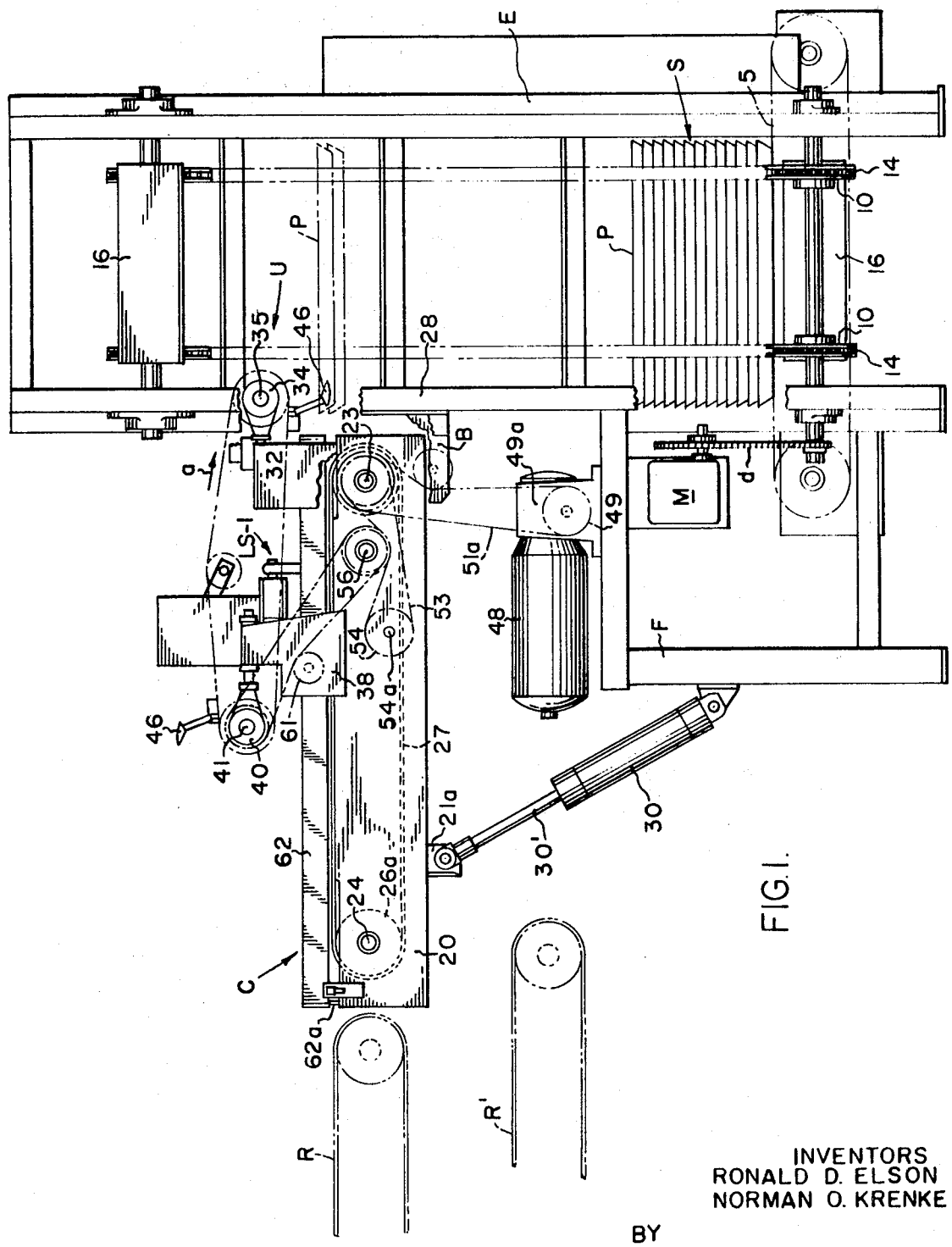
FIG. 1 is a front elevational view of apparatus formed according to the invention shown in normal operating position, certain parts being broken away for purposes of clarity.

Apparatus constructed according to the disclosed embodiment of the invention is adapted for use with an elevator assembly, generally shown at E in FIG. 1, including vertically disposed spaced apart pairs of endless chains 10 trained around sprocket wheels 14 and having a pair of tray-supporting spanning bars 16 arranged thereon. A motor M is drivingly connected with the chains 10 by a drive chain $d$ trained around suitable chain driving sprockets. Successive stacks S of trays P are presented to the elevator E by a suitable endless conveyor, shown in phantom lines at 5 and a stack S of nested pallets P is shown resting on the conveyor 5 in a position to be raised vertically upwardly by a tray-supporting spanning bar 16. The apparatus comprising the elevator E and conveyor 5, and the method of operating these elements has been more fully described in the aforereferenced patent application and need not be repeated herein. It is sufficient to state that the conveyor 5 will successively deliver stacks S of pallets to the elevator E which will raise them upwardly to a raised position (shown in chain lines) in which the uppermost tray is in a position to be unstacked by unstacking apparatus, generally indicated at U.

The unstacking apparatus U, to be later described in detail, is mounted to overlie the supply end of receiving conveying apparatus, generally shown at C, and is operative to sequentially unstack the trays or pallets from the stack S of pallets P and individually deliver them to the conveyor C in a manner also to be described more fully hereinafter.

The conveying apparatus C which receives the unstacked pallets, includes a pair of laterally spaced apart side frames 20 having suitable crossmembers such as shown at 21 and 22, spanning the distance therebetween. At both the supply and discharge ends of the conveyor C, the side frame members 20 mount suitable sets of bearing blocks 25 which journal drive and driven shafts 23 and 24, respectively. The shafts 23 and 24 mount drive and driven belt driving rollers 26 and 26a, respectively, around which a conveyor belt 27 is trained in the usual manner.

For supporting the supply end of the conveyor C, a pair of mounting brackets B (FIG. 3), disposed on opposite sides of the conveyor C, are welded or otherwise suitably secured to the upwardly extending support posts 28 of the elevator E and mount bearing blocks 29 which pivotally support the shaft 23. To pivot the conveyor C downwardly about the shaft 23, from the position shown in FIG. 1 to the position shown in FIG. 2, for discharging mispositioned pallets in a manner to be later described, a double-acting solenoid operated pneumatic cylinder 30, connected at its lower end with the frame F, has a piston 30a pivotally connected with the crossmember 21 fixed to the underside of the frame of the conveyor C.

For mounting the unstacking apparatus U atop the conveyor C, the side frame members 20 support a pair of upwardly extending support brackets 32 adjacent the supply end of the conveyor C and a similar pair of vertically extending mounting brackets 38 forwardly of the first pair of brackets 32. A support bar 33 spans the rearward brackets 32 and adjustably mounts a pair of bearing hangers 34 journaling an idler shaft 35 having a sprocket 36 fixed thereto. The forward brackets 38 mount a spanning support bar 39 on which are a pair of laterally spaced apart bearing hangers 40 which journal a shaft 41 having a drive sprocket 42 fixed to substantially the midportion thereof in any suitable manner. An unstacking drive chain, diagrammatically shown at 45, is trained around the sprockets 42 and 36, and mounts a pair of hooks 46 in a manner more particularly described in the above-referenced patent application. The hangers 40 have a threaded connection 40a with mount blocks 40b on the support 39 and are adjustable forwardly and rearwardly. As the chain 45 is driven clockwisely in the direction of the arrow $a$ (FIG. 1), the hook members 46 function, in a manner generally described with reference to FIGS. 3–5 of the aforereferenced application, to lift the uppermost tray upwardly and transfer it laterally to the conveying belt 27. If the unstacked pallets are misoriented with respect to the conveyor belt 27, the misorientation of the unstacked pallets is sensed by a limit switch LS–3 which includes an actuator arm LS–3a and opens the normally closed contacts LS–3b (FIG. 4) for a purpose to be later more particularly described. A chain takeup sprocket 43 is mounted on a support arm 44 fixed to the crossmember 22 for adjusting the tension of the chain 45.

Mounted adjacent the output or discharge end of the conveyor C is a pair of vertically spaced receiving conveyors, diagrammatically illustrated at R and R'. The conveyor C is shown in its normal position in alignment with the conveyor R which is to receive properly positioned individual pallets. The conveyor C is moved between the respective conveyors R and R' by the pneumatic cylinder 30. As will be described more fully hereinafter, when the limit switch LS–3 is actuated by a misoriented pallet, the cylinder 30 lowers the discharge end of the conveyor to discharge the misoriented pallets to the conveyor R'.

Drive apparatus for the conveying belt 27 of the conveyor C comprises a motor 48 mounted on the frame F and driving sprocket diagrammatically shown at 49, through suitable reduction gearing 49a. A chain, diagrammatically shown at 51a is trained around the drive sprocket 49 and a driven sprocket 51, which is mounted on one end of the shaft 23. The shaft 23 mounts a sprocket 52 at its opposite end and a chain, diagrammatically shown at 53, is trained around the sprocket 52 and a sprocket 54 mounted on a suitable shaft 54a journaled in a bearing block 55 (FIG. 3) fixed to the conveyor side frame 20. A shaft 56, spanning the conveyor C and journaled in bearing blocks 57 (FIG. 3) connected with the conveyor side frames 20, mounts a sprocket 58 in driving engagement with the chain 53, and an output sprocket 59 (FIG. 3), at its opposite end, driving a chain 59a trained around a sprocket 60 mounted on the shaft 41. A takeup sprocket 61 is in driving engagement with the chain 59a and is adjustably mounted on one side frames 20, in any suitable manner, for adjusting the tension of the chain 59a, as necessary. A pair of pallet guides 62 are mounted above the frames 20 on mounts 62a and extend inwardly thereof for guiding the pallets as they pass along the conveyor belt 27.

Mounted on one side of the discharge end of the conveyor C, for a purpose to be later described, is an electric eye 50 including contacts 50a and 50b (FIG. 4), which are normally closed when a light beam $x$ transmitted by a source of light 50', mounted on the opposite side of the conveyor, is not interrupted. Mounted on the crossmember 22 for actuating the cylinder 30 is a limit switch, generally shown as LS–1, having a switch arm LS–1' depending therefrom to an extent whereby single unstacked pallets being conveyed by the belt 27 are permitted to freely pass thereunder, whereas the passage of a "-double" moves the switch arm LS–1' to actuate the limit switch LS–1, which opens the normally closed contacts LS–1b and opens the normally closed contacts LS–1a (FIG. 4).

Figure 2:
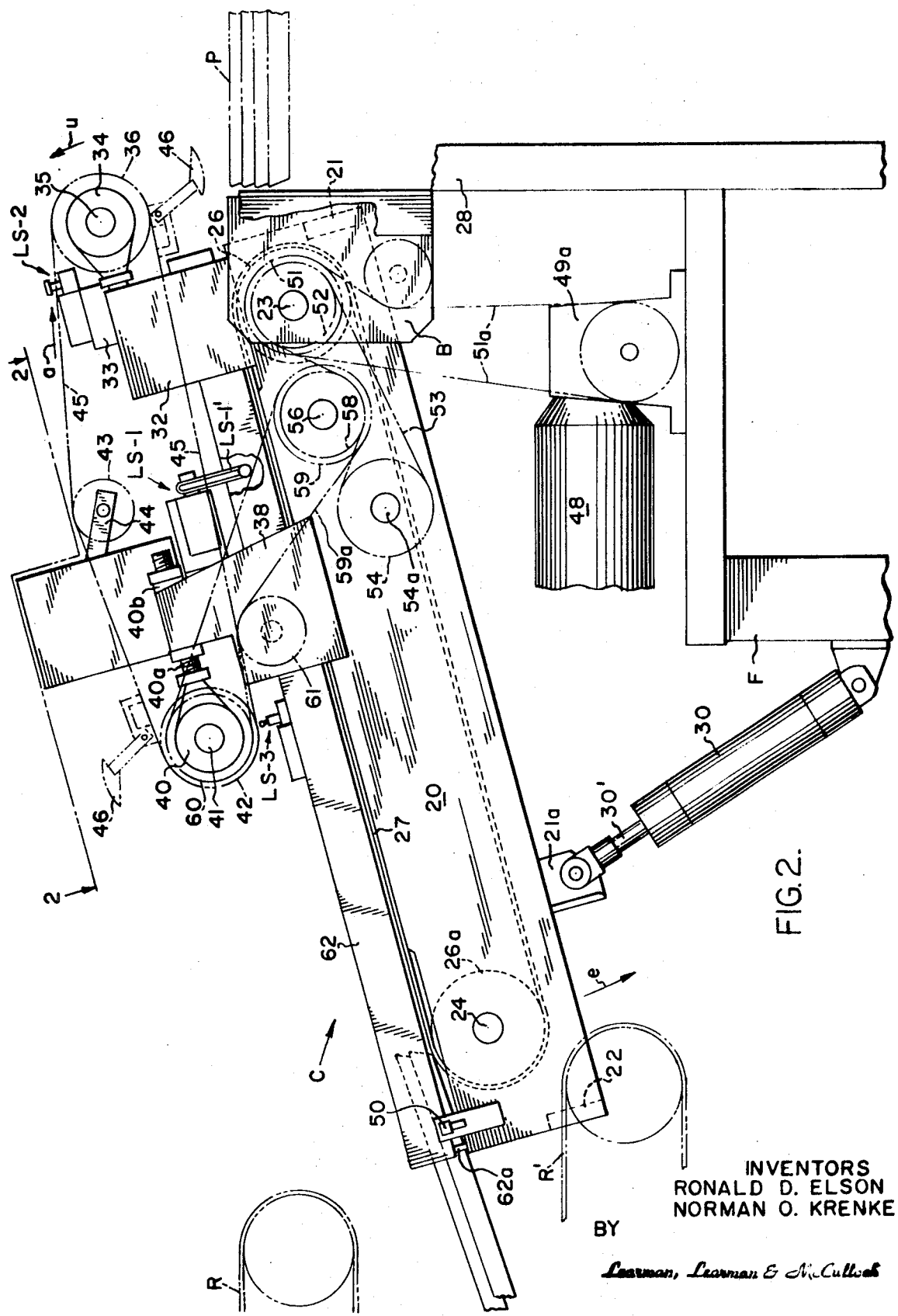
FIG. 2 is a fragmentary enlarged front elevational view of the conveying and unstacking apparatus, illustrating the apparatus in a position in which mispositioned pallets are being discharged and the unstacker is disabled, parts being broken away to more clearly illustrate the invention.
Figure 3:
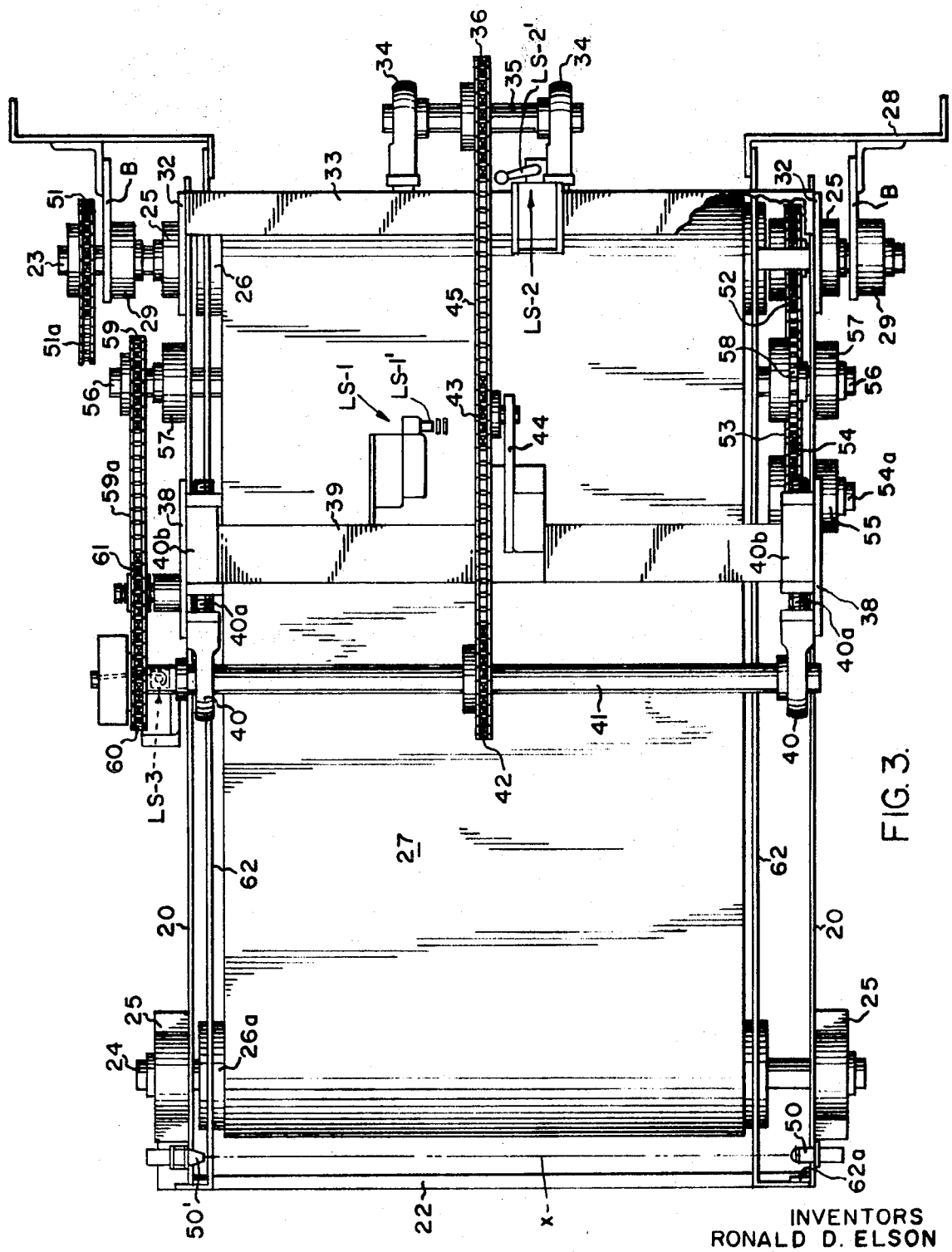
FIG. 3 is a fragmentary top plan view of the conveying and unstacking apparatus taken along the line 3—3 of FIG. 2.

Mounted on the transverse bar 33 at the supply end of the conveyor is a limit switch LS–2 having normally closed contacts LS–2a (FIG. 4) and normally open contacts LS–2b (FIG. 4) which are opened and closed respectively when the plunger arm LS–2' associated therewith is actuated (by suitable mechanism not shown) as the conveyor C pivots to the FIG. 2 position.

Figure 4:
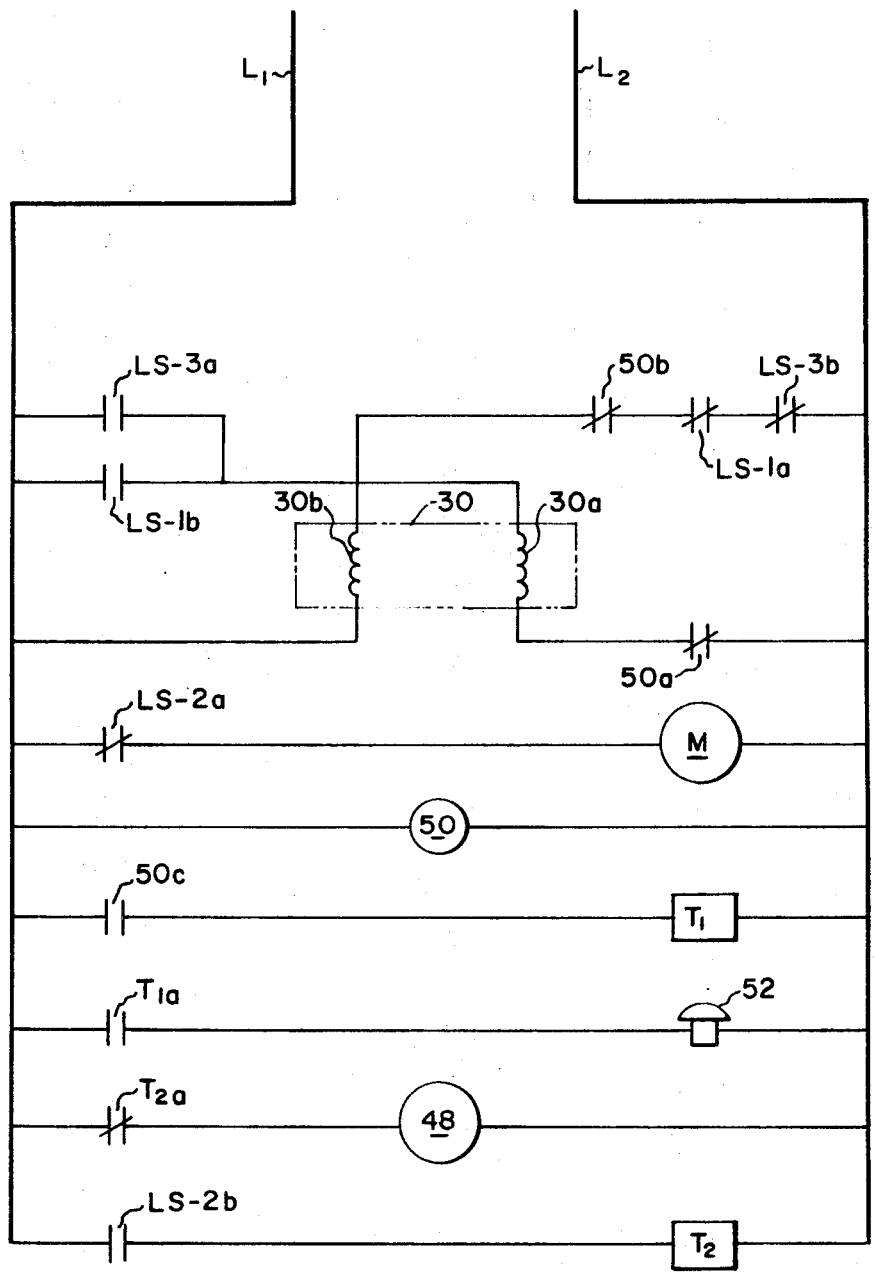
FIG. 4 is an electrical schematic diagram illustrating a typical control circuit for operating the conveying and unstacking apparatus.

Referring now to FIG. 4, a suitable source of power such as 110 volt 60 cycle alternating current is connected across lines $L_1$ and $L_2$. The cylinder 30 is shown diagrammatically in FIG. 4 as including a solenoid 30a which, when energized, actuates a valve permitting fluid to move the piston 30a in a direction to lower the conveying means C from the position shown in FIG. 1 to the position shown in FIG. 2, and a solenoid 30b, which when energized actuates a valve causing fluid to move the piston 30a in a direction to raise the conveying means C from the position shown in FIG. 2 to the position shown in FIG. 1. The solenoid 30a is connected across lines $L_1$ and $L_2$ in series with the normally closed contacts 50a of the electric eye 50 and a parallel circuit including one branch having the normally open contacts LS–1b of the limit switch LS–1, and another branch having the normally open contacts LS–3a of the limit switch LS–3. The solenoid 30b is connected in series across the lines $L_1$ and $L_2$ with the normally closed contacts 50b of the electric eye 50, the normally closed contacts LS–b of the limit switch LS–3, and the normally closed contacts LS–1a of the limit switch LS–1.

Connected in series with the motor M for operating the elevator E is the set of normally closed contacts LS–2a which are open when the rearward supply end of the conveyor C is raised upwardly and the arm LS–2' of the limit switch LS–2 is actuated by engaging a suitable fixed member, now shown. The electric eye 50 is shown connected across the lines $L_1$ and $L_2$ and includes a set of normally open contacts 50c which are closed when the beam $x$ is interrupted. The contacts 50c are connected in series with a timer $T_1$ across the lines $L_1$ and $L_2$. The timer $T_1$ includes a set of normally open contacts $T_{1a}$ which will close when the timer $T_1$ times out. The normally open contacts LS–2b of the limit switch LS–2 are connected in series with a timer $T_2$ including normally closed contacts $T_{2a}$ which will close when the timer $T_2$ times out. The contacts $T_{2a}$ are connected in series with the conveyor drive motor 48 across the lines $L_1$ and $L_2$.

In operation, the conveyor 5 will deliver stacks of pallet S to the elevator E on demand as described in the above mentioned patent application. The elevator E, driven by the motor M, will raise the stack S of pallets P upwardly until the uppermost pallet is in the position shown in phantom in FIG. 1, after which time the hook 46 of the unstacking means U will lift the uppermost pan upwardly and move it to the conveying belt 27. The elevator E will continue to index the stack upwardly as the uppermost pans are sequentially removed as also described in the referenced patent application. If only a single trays are unstacked, the limit switch LS–1 will not be actuated, and the unstacked trays will proceed from the conveying means C to the upper receiving conveyor R. If, however, a "-double" is unstacked, the increased thickness of the nested pans passing along the conveyor means C will engage the actuating arm LS–1' to actuate the limit switch LS–1, thereby closing the normally open contacts LS–1b to energize the solenoid 30a to drive the piston rod 38 downwardly and move the conveying means C from the position shown in FIG. 1 to the position shown in FIG. 2. Similarly, if a pallet is misoriented, the limit switch LS–3 will be actuated to close and open the contacts LS–3a and LS–3b, respectively, to energize the solenoid 30a, and the discharge end of the conveyor C will lower. It should be noted at this point, that if an acceptable single pallet is at the eye position 50 adjacent the discharge end of the conveyor means C to interrupt the beam $x$, the contacts 50a will remain open and thus prevent the conveying means C from dropping until the acceptable pallet is moved onto the conveying means R. After the nested pallets move beyond the limit switch LS–1 and the contacts LS–1a are returned to their original position, and after the mispositioned pallets proceed forwardly of the limit switch LS–3 to return contacts LS–3a to their original position, the solenoid 30b is not actuated until the electric eye 50 is cleared to close the contacts 50b. The electric eye 50 thus insures that the rejected mispositioned pallets are completely off the discharge end of the conveyor C before actuating the solenoid 30b controlling the air cylinder 30 to raise the conveyor C to its normal operating position. If the spacing between the limit switches LS–1 and LS–3 and the beam $x$ is more than the width of a pallet, suitable timers may be connected in circuit to prevent the solenoid 30b from being actuated for the time required to convey the mispositioned pallet into the beam interrupting position. The third set of normally open electric eye contacts 50c close when the beam $x$ is interrupted by the passage of either a single pallet when conveyor C is in the raised position or mispositioned pallets when the conveyor C is in the lowered position, to energize the timer $T_1$. If a pallet remains at the eye 50 location longer than a predetermined time, the timer $T_1$ will timeout and the normally open contacts $T_{1a}$ will close to energize an audible alarm 52 to provide the operator with an indication that an abnormal condition exists.

When the conveyor C pivots about the shaft 23, to move to the position shown in FIG. 2, the limit switch LS–2 is actuated to open the normally closed contacts LS–2a and interrupt the elevator motor M. As the conveyor C pivots downwardly, the unstacking chain 45 mounting the unstacking hooks 46 of the unstacking mechanism U continues to operate as the motor 48 continues to operate and drive the unstacking chain 45 through chain drives 51 and 59a. However, as the discharge end of the conveyor C is pivoted downwardly in the direction of arrow $d$, the supply end of conveyor C is pivoted upwardly in the direction of the arrow $u$. Thus, the shaft 35, which extends rearwardly beyond the supply end of the conveyor C, also pivots upwardly in the direction of the arrow $u$. Consequently, the hook 46 which is adjacent the rearward supply end of the conveyor means C is moved upwardly and accordingly passes over the uppermost pallet P without engaging it. Thus, the unstacking mechanism is disabled temporarily and the unstacking operation is temporarily halted. When the limit switch LS–2 is actuated, the normally open contacts LS–2b also close to energize the timer $T_2$, and, if the conveyor is not returned to the normal position shown in FIG. 1 within a predetermined time, the timer $T_2$ will time out and the contacts $T_{2n}$ will open to deenergize the motor 48 and, disable movement of the unstacking chains 45 mounting the hooks 46 of the unstacking mechanism U. Thus, if a jam occurs to prevent the discharge of the conveyors within the predetermined time, movement of the unstacking chains of the unstacking mechanism U will be prevented.

It is to be understood that the drawings and descriptive matter are in all cases to be interpreted as merely illustrative of the principles of the invention, rather then limiting the same in any way, since it is contemplated that various changes may be made in various elements to achieve like results without departing from the spirit of the invention or the scope of the appended claims.

I claim:

1. In combination:
   unstacking means, movable between a raised disabled position and a lowered operative position, for sequentially unstacking a stack of nested pallets by sequentially removing the uppermost pallet in the stack;
   receiving conveying means, receiving unstacked pallets from said unstacking means, having supply and discharge ends, and mounted for movement between a first normal conveying position for conveying said unstacked pallets individually in a first path of travel and a second reject position for discharging mispositioned pallets in a second path of travel; and
   means for moving said conveying means to said reject position to discharge the mispositioned pallets along said second path and substantially simultaneously moving said unstacking means from said operative to said inoperative position to preclude unstacking while said receiving conveying means is in said reject position.

2. The combination as set forth in claim 1 including elevating means for indexing the stack of pallets upwardly in sequence as the uppermost pallet in said stack is removed; and means responsive to said unstacking means being moved to said inoperative position for rendering said elevating means inoperative.

3. The combination as set forth in claim 1 including means responsive to the presence of a pallet adjacent the discharge end of said conveying means for preventing said conveying means from moving from said first normal conveying position to said second reject position until the pallet is removed from said conveying means.

4. The combination as set forth in claim 1 wherein said moving means is responsive to the presence of a mispositioned pallet on said conveying means.

5. The combination as set froth in claim 4 wherein said means responsive to the presence of a mispositioned pallet includes means responsive to the presence of a double on said conveying means for moving said conveying means to said reject position to discharge the double in said second path of travel.

6. The combination as set forth in claim 5 including means for sensing the presence of a double adjacent the discharge end of the conveying means when said conveying means is in said reject position for preventing the return of said conveyor to the normal conveying position until the double adjacent the discharge end has been discharged from the conveying means.

7. The combination as set forth in claim 6 including audible means for indicating that the double adjacent the discharge end is not discharged from the conveying means within a predetermined time.

8. The combination as set forth in claim 1 wherein said conveying means is mounted for up and down movement; said unstacking means being supported by the conveying means adjacent the supply end thereof; said means for moving the conveying means including means for simultaneously lowering the discharge end of the conveying to discharge the mispositioned pallets along the second path and raising the supply end of the conveying means to raise the unstacking means to its inoperative position.

9. The combination as set forth in claim 8 wherein said conveying means is pivotally movable about the supply end thereof and said means for moving includes means for pivoting said conveyor about said supply end.

10. The combination as set forth in claim 1 wherein said unstacking means includes hook means for lifting the uppermost pallet from said stack and laterally moving conveying means mounting said hook means for laterally moving said hook means whereby said uppermost pallet is removed from said stack and positioned on said receiving conveying means.

11. The combination as set forth in claim 10 including means for disabling said laterally moving conveying means if said unstacked pallets are not discharged from said receiving conveying means within a predetermined time.

12. The combination set forth in claim 1 wherein said unstacking means is mounted on said first mentioned conveying means for movement therewith between said operative and disabled positions when said conveying means is moved between said normal conveying and discharge positions respectively; said unstacking means comprising lift means for engaging and unstacking the uppermost pallet and endless conveying means for laterally conveying said lift means to move the uppermost pallet carried thereby from said stack to said first mentioned conveying means.

13. In combination:
   means for supporting a stack of pallets at an unstacking station;
   pallet receiving conveying means having supply and discharge ends and being mounted adjacent said stack supporting means for pivotal movement, about an axis interjacent said supply and discharge ends, between a normal conveying position and a reject position to swing the supply end of said receiving conveying means between lowered and raised portions, respectively;
   pallet unstacking means, mounted on said pallet receiving conveying means for pivotal movement therewith between disabled and operative positions when said supply end moves between the raised and lowered positions, respectively, said pallet unstacking means comprising normally continuously moving endless conveying means mounting projecting pallet gripping means for movement therewith in a path of travel across at least a portion of the stack supporting means so as to engage, destack, and laterally transfer the uppermost pallet in the stack to said receiving conveying means; and
   means for pivoting said receiving conveying means about said axis from said normal conveying position, in which it receives unstacked pallets from said pallet gripping means and conveys said unstacked pallets individually in a first path of travel, to said reject position, in which it conveys mispositioned pallets received from said unstacking means along a second path of travel, and substantially simultaneously moves said pallet gripping means from said operative position to said disabled position to preclude further unstacking while said receiving conveying means is in said reject position.

14. The apparatus set forth in claim 13 wherein said pallet gripping means comprises pivotally supported hooks; and said pallet unstacking means includes supply and discharge ends; said pivotal axis being interjacent the supply and discharge ends of said pallet unstacking means; the discharge ends of said pallet receiving and pallet unstacking means being pivoted downwardly simultaneously when the supply end of the pallet receiving conveying means is pivoted upwardly to pivot the supply end of said pallet unstacking means upwardly and move any hook at the unstacking station upwardly to prevent unstacking while the pallet receiving conveyor means is in said reject position.

15. In combination:

means for supporting a stack of pallets;

conveying means having supply and discharge ends and being mounted adjacent said stack supporting means for swinging movement between a normal conveying position and a reject position to swing the supply end of the conveying means between lowered and raised positions respectively;

unstacking means, mounted on said conveying means for swinging movement therewith between disabled and operative positions when said supply end of the conveying means moves between said raised and lowered positions, respectively, for sequentially unstacking, in the operative position, the stack of nested pallets by sequentially removing the uppermost pallet in said stack and delivering it to said supply end of said conveying means; and means for moving said conveying means from said normal conveying position, in which it receives unstacked pallets from said unstacking means and conveys said unstacked pallets individually in a first path of travel, to said reject position, in which it conveys mispositioned pallets received from said unstacking means along a second path of travel, and substantially simultaneously moving said unstacking means from said operative position to said disabled position to preclude unstacking while said conveying means is in said reject position.

* * * * *